(12) United States Patent
Yamashita et al.

(10) Patent No.: US 11,754,128 B2
(45) Date of Patent: Sep. 12, 2023

(54) BONDING PART, MULTIPLE-PLATE CLUTCH DEVICE PROVIDED WITH SAID BONDING PART, AND MANUFACTURING METHOD OF BONDING PART

(71) Applicant: Kabushiki Kaisha F.C.C., Hamamatsu (JP)

(72) Inventors: Akihiro Yamashita, Shizuoka (JP); Kyohei Morimoto, Shizuoka (JP); Tatsuki Hosoda, Shizuoka (JP); Xingyu Ren, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/767,207

(22) PCT Filed: Nov. 5, 2019

(86) PCT No.: PCT/JP2019/043296
§ 371 (c)(1),
(2) Date: Apr. 7, 2022

(87) PCT Pub. No.: WO2021/079533
PCT Pub. Date: Apr. 29, 2021

(65) Prior Publication Data
US 2022/0349448 A1 Nov. 3, 2022

(30) Foreign Application Priority Data
Oct. 25, 2019 (JP) .................................. 2019-194069

(51) Int. Cl.
*F16D 13/64* (2006.01)
*F16D 69/04* (2006.01)
(Continued)

(52) U.S. Cl.
CPC .......... *F16D 13/648* (2013.01); *B23K 26/364* (2015.10); *F16D 13/52* (2013.01); *F16D 69/0408* (2013.01); *F16D 2300/12* (2013.01)

(58) Field of Classification Search
CPC ........ F16D 13/00–74; F16D 69/00–2069/0491
See application file for complete search history.

(56) References Cited

U.S. PATENT DOCUMENTS 5,004,089 A * 4/1991 Hara ....................... B29C 43/36
192/107 M
5,076,410 A 12/1991 Maycock et al.
(Continued)

FOREIGN PATENT DOCUMENTS

JP 3-505620 A 12/1991
JP 6-14572 U 2/1994
(Continued)

OTHER PUBLICATIONS

International Search Report (ISR) dated Dec. 10, 2019 filed in PCT/JP2019/043296.
(Continued)

*Primary Examiner* — Ernesto A Suarez
*Assistant Examiner* — Lillian T Nguyen
(74) *Attorney, Agent, or Firm* — Rankin, Hill & Clark LLP

(57) ABSTRACT

Provided are a joint component formed with fine recessed portions, a multiplate clutch device including the joint component, and a joint component manufacturing method. At the joint component, many fine recessed portions are formed at a joint surface joined to a joint object. The joint surface is formed in a circular ring shape along a peripheral direction of the base body, and is formed with a flatness of equal to or less than 0.15 mm. The fine recessed portions are formed at the joint surface such that adjacent ones of the fine
(Continued)

recessed portions do not overlap with each other and a formation density per unit area at the joint surface is uniform. The fine recessed portions are formed as laser processing marks formed at the base body by irradiation with laser light.

10 Claims, 7 Drawing Sheets

(51) Int. Cl.
  *B23K 26/364* (2014.01)
  *F16D 13/52* (2006.01)

(56) References Cited

U.S. PATENT DOCUMENTS

| | | | |
|---|---|---|---|
| 5,452,784 A | 9/1995 | Miyoshi et al. | |
| 5,899,310 A | 5/1999 | Mizuta | |
| 2007/0108009 A1* | 5/2007 | Ando | F16D 13/64 192/84.91 |
| 2014/0227559 A1 | 8/2014 | Steinmeiz et al. | |
| 2016/0281810 A1 | 9/2016 | Terauchi et al. | |
| 2017/0276191 A1* | 9/2017 | Farahati | B23K 26/355 |
| 2019/0277344 A1 | 9/2019 | Farahati et al. | |

FOREIGN PATENT DOCUMENTS

| | | | | |
|---|---|---|---|---|
| JP | 9-324824 A | 12/1997 | | |
| JP | 10-299798 A | 11/1998 | | |
| JP | 2015-502255 A | 1/2015 | | |
| JP | 2018-200114 A | 12/2018 | | |
| WO | 02/070916 A1 | 9/2002 | | |
| WO | WO-2011074481 A1 * | 6/2011 | | F16D 13/648 |
| WO | 2015/040706 A1 | 3/2015 | | |

OTHER PUBLICATIONS

Japanese Office Action (JPOA) dated Dec. 3, 2019 for corresponding Japanese Patent Application No. 2019-194069.
Decision to Grant dated Mar. 17, 2020 for corresponding Japanese Patent Application No. 2019-194069.
Extended European Search Report (EESR) dated Jul. 17, 2023 for European Patent Application No. 19950026.5.

* cited by examiner

BONDING PART, MULTIPLE-PLATE CLUTCH DEVICE PROVIDED WITH SAID BONDING PART, AND MANUFACTURING METHOD OF BONDING PART

TECHNICAL FIELD

The present invention relates to a joint component configured such that a joint object is joined to a planar joint surface formed at a metal base body, a multiplate clutch device including the joint component, and a joint component manufacturing method.

BACKGROUND ART

Typically, a vehicle such as a four-wheeled vehicle or a two-wheeled vehicle has been equipped with a multiplate clutch device for transmitting rotary drive force of a motor such as an engine to a drive target such as a wheel or blocking such force transmission. Generally, in the multiplate clutch device, two plates, i.e., a drive-side plate and a driven-side plate, arranged facing each other are pressed against or separated from each other in lubricant oil, and in this manner, the rotary drive force is transmitted or blocked.

In this case, one of these two plates is a wet friction plate configured such that friction members are provided along a peripheral direction on a surface of an annular flat plate-shaped core. For example, at a clutch plate disclosed in Patent Literature 1 below, many recesses are formed at each side surface of a core plate as a core formed in an annular flat plate shape for the purpose of improving the adhesion strength of a facing as a friction member.

CITATION LIST

Patent Literature

PATENT LITERATURE 1: JP-A-9-324824

However, at the clutch plate described in Patent Literature 1 above, many recesses are formed by sandblasting. For this reason, there is a problem that the flatness of the core is degraded due to, e.g., an uneven density of collision of sand grains with the core, an uneven strength of such collision, and uneven formation of the recesses between both side surfaces of the core.

The present invention has been made for coping with the above-described problem. An object of the present invention is to provide a joint component formed with fine recessed portions so that degradation of the flatness of a metal base body, such as a core, to which a joint object such as a friction member is joined can be reduced, a multiplate clutch device including the joint component, and a joint component manufacturing method.

SUMMARY OF INVENTION

In order to achieve the above object, as a feature of the present invention, there is provided a joint component including: a metal base body having a joint surface formed as a flat surface; and a joint object to be joined to the joint surface. The joint surface has a flatness of equal to or less than 0.2 mm, and is formed with many fine recessed portions formed in a recessed shape. The fine recessed portions are formed such that adjacent ones of the fine recessed portions do not overlap with each other and a formation density per unit area smaller than an area of the joint surface is uniform.

According to the feature of the present invention configured as described above, in the joint component, many fine recessed portions formed at the joint surface of the metal base body as a target to which the joint object is to be joined are formed not to overlap with each other and to have the uniform formation density per unit area. With this configuration, the flatness of the joint surface can be equal to or less than 0.2 mm. Note that the fine recessed portion is a bottomed hole or a through-hole opening at the joint surface with such a size that the fine recessed portion is within a circle with a diameter of 40 μm to 120 μm. Moreover, the unit area is the area of a square region as viewed in plane at the joint surface, and for example, is 1 mm$^2$ or 1 cm$^2$.

Note that Patent Literature 1 above describes, with reference to FIGS. 3 and 6, a state in which adjacent ones of the recesses are formed not to overlap with each other at the core plate. However, the recesses in Patent Literature 1 above are formed by sandblasting. For this reason, it is impossible that the recesses are formed not to overlap with each other. That is, FIGS. 3 and 6 in Patent Literature 1 above are schematically shown for the sake of understanding of the recesses formed at the core plate, and do not intended to disclose the invention of the present application.

Moreover, as another feature of the present invention, in the joint component, the fine recessed portions are formed such that a total opening area as viewed in plane in the unit area is equal to or greater than 40% and equal to or less than 80% with respect to the unit area.

According to another feature of the present invention configured as described above, in the joint component, the total opening area of the fine recessed portions as viewed in plane in the unit area is equal to or greater than 40% and equal to or less than 80% with respect to the unit area. With this configuration, the fine recessed portions can be easily formed not to overlap with each other and to have the uniform formation density per unit area.

Moreover, as another feature of the present invention, in the joint component, the fine recessed portions are formed such that a distance between adjacent ones of the fine recessed portions is uniform.

According to another feature of the present invention configured as described above, in the joint component, the distance between adjacent ones of the fine recessed portions is uniform. With this configuration, the fine recessed portions can be easily formed not to overlap with each other and to have the uniform formation density per unit area.

Moreover, as another feature of the present invention, in the joint component, the fine recessed portions are processing marks formed by laser light.

According to another feature of the present invention configured as described above, in the joint component, the fine recessed portions are the processing marks formed by laser light. With this configuration, the fine recessed portions can be easily formed not to overlap with each other and to have the uniform formation density per unit area. Moreover, since residual stress on the joint surface is less in laser processing than in sandblasting, degradation of the flatness of the joint surface can be reduced.

Moreover, as another feature of the present invention, in the joint component, the joint surface is formed in a circular or circular ring shape as viewed in plane, and the fine recessed portions are formed to be arranged in a spiral shape in a peripheral direction of the joint surface.

According to another feature of the present invention configured as described above, in the joint component, the joint surface is formed in the circular or circular ring shape as viewed in plane, and the fine recessed portions are formed so as to be arranged in the spiral shape in the peripheral direction of the joint surface. With this configuration, the fine recessed portions can be easily formed not to overlap with each other and to have the uniform formation density per unit area.

Moreover, as another feature of the present invention, in the joint component, the base body includes a core formed in an annular flat plate shape, the joint object includes a friction member bonded to a surface of the core along the peripheral direction, and the joint component includes friction plates arranged facing each other in a clutch device or a brake device and configured to closely contact or separate from each other to transmit or block rotary drive force between the friction plates.

According to another feature of the present invention configured as described above, in the joint component, the base body includes the core formed in the annular flat plate shape, and the joint object includes the friction member bonded to the surface of the core along the peripheral direction. With this configuration, the joint components can be formed as the friction plates arranged facing each other in the clutch device or the brake device and configured to closely contact or separate from each other to transmit or block the rotary drive force therebetween. That is, the invention of the present application can be also implemented as an invention relating to the friction plates arranged facing each other in the clutch device or the brake device and configured to closely contact or separate from each other to transmit or block the rotary drive force therebetween.

Moreover, as another feature of the present invention, in the joint component, a depth of each of the fine recessed portions from the joint surface is equal to or less than 10 μm.

According to another feature of the present invention configured as described above, in the joint component as the friction plate, the fine recessed portions are formed such that the depth of each fine recessed portion from the joint surface is equal to or less than 10 μm. With this configuration, degradation of the flatness of the thin friction plate can be effectively reduced.

Moreover, as another feature of the present invention, in the joint component, the fine recessed portions are formed only in a region, where the friction member is arranged, in a circular ring shape in the peripheral direction at the core.

According to another feature of the present invention configured as described above, in the joint component as the friction plate, the fine recessed portions are formed only in the region, where the friction member is arranged, in the circular ring shape in the peripheral direction at the core. With this configuration, the fine recessed portions can be efficiently formed, and degradation of the flatness of the thin friction plate can be effectively reduced.

Moreover, as another feature of the present invention, in the joint component, the fine recessed portions are also formed at a portion of the base body other than a portion to which the joint object is joined, and the base body includes a cover layer covering the fine recessed portions formed at the portion other than the portion to which the joint object is joined.

According to another feature of the present invention configured as described above, the joint component includes the cover layer covering the fine recessed portions formed at the portion of the base body other than the portion to which the joint object is joined. Since the fine recessed portions formed at the portion other than the portion to which the joint object is joined are covered, influence due to the fine recessed portions, specifically, e.g., degradation of the flowability of lubricant oil due to the fine recessed portions exposed through the core, can be reduced.

The present invention can be implemented not only as the invention relating to the joint component, but also as an invention relating to a multiplate clutch device including the joint component and an invention relating to a joint component manufacturing method.

Specifically, in the multiplate clutch device for transmitting or blocking rotary drive force between a drive-side plate to be rotatably driven by a motor and a driven-side plate arranged facing the drive-side plate through a clearance in such a manner that the drive-side plate and the driven-side plate closely contact or separate from each other, at least one of the drive-side plate or the driven-side plate may be the friction plate as the joint component provided in the clutch device according to any one of claims 6 to 9. According to this configuration, features and advantageous effects similar to those of the above-described joint component can be expected from the multiplate clutch device.

Moreover, regarding the joint component manufacturing method for manufacturing a joint component configured such that a joint object is joined to a joint surface as a flat surface formed at a metal base body, the method may include: a base body preparation step of preparing the base body having the joint surface with a flatness of equal to or less than 0.2 mm; a fine recessed portion formation step of forming many fine recessed portions at least at the joint surface by irradiating the base body with laser light while relatively displacing the laser light; and a joint object joining step of joining the joint object to the joint surface. At the fine recessed portion formation step, the fine recessed portions may be formed in such arrangement that adjacent ones of the fine recessed portions do not overlap with each other and a formation density per unit area smaller than an area of the joint surface is uniform.

In this case, the above joint component manufacturing method may further include a cover layer formation step of forming a cover layer covering the fine recessed portions.

Moreover, in the cases above, in the joint component manufacturing method, the joint surface may be formed in a circular or circular ring shape, and at the fine recessed portion formation step, the fine recessed portions may be formed to extend in a spiral shape along a peripheral direction of the joint surface. According to this joint component manufacturing method, features and advantageous effects similar to those of the above-described joint component can be expected.

DESCRIPTION OF EMBODIMENTS

Figure 1:
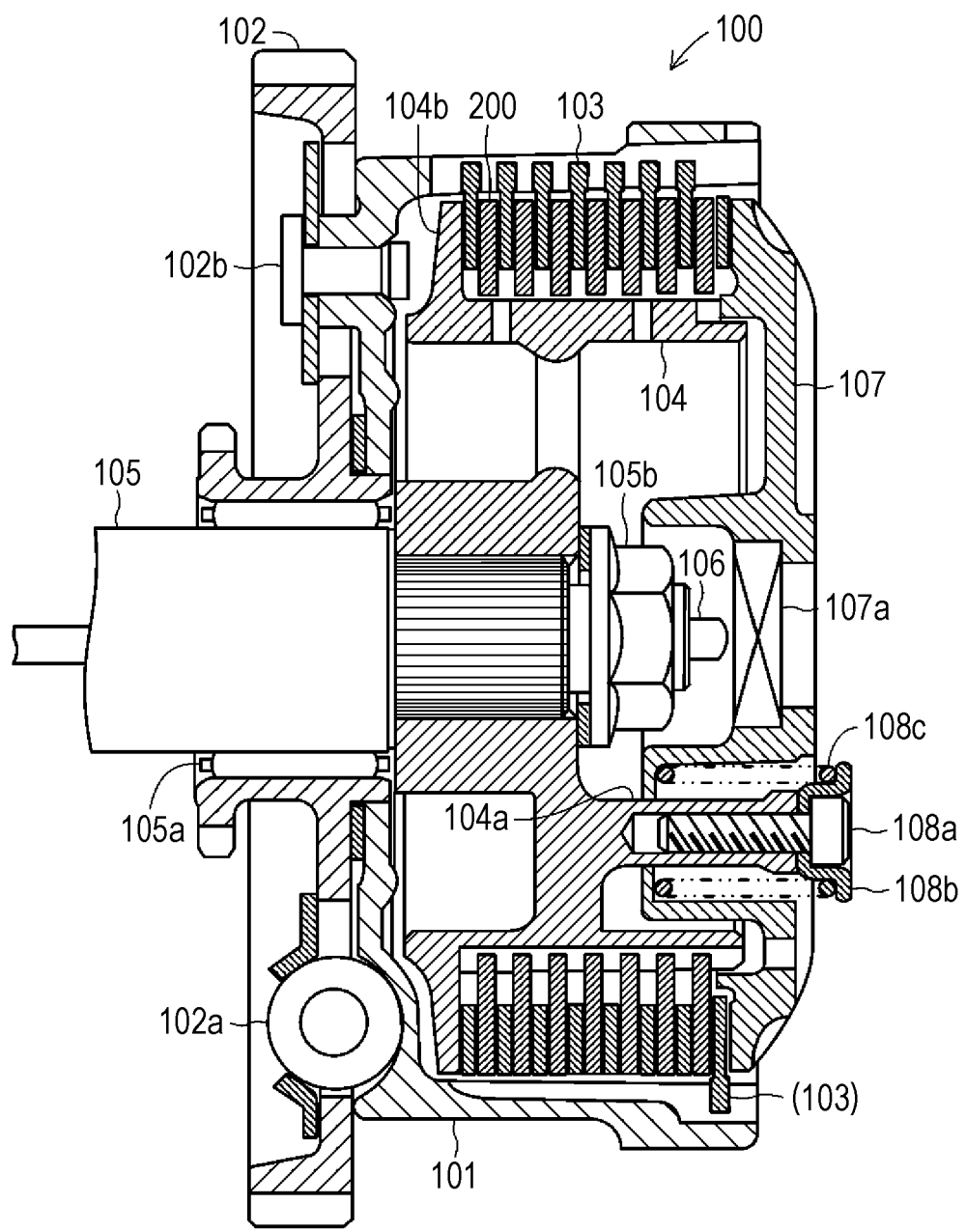
FIG. 1 is a sectional view showing an entire configuration of a multiplate clutch device including friction plates according to the present invention.
Figure 2:
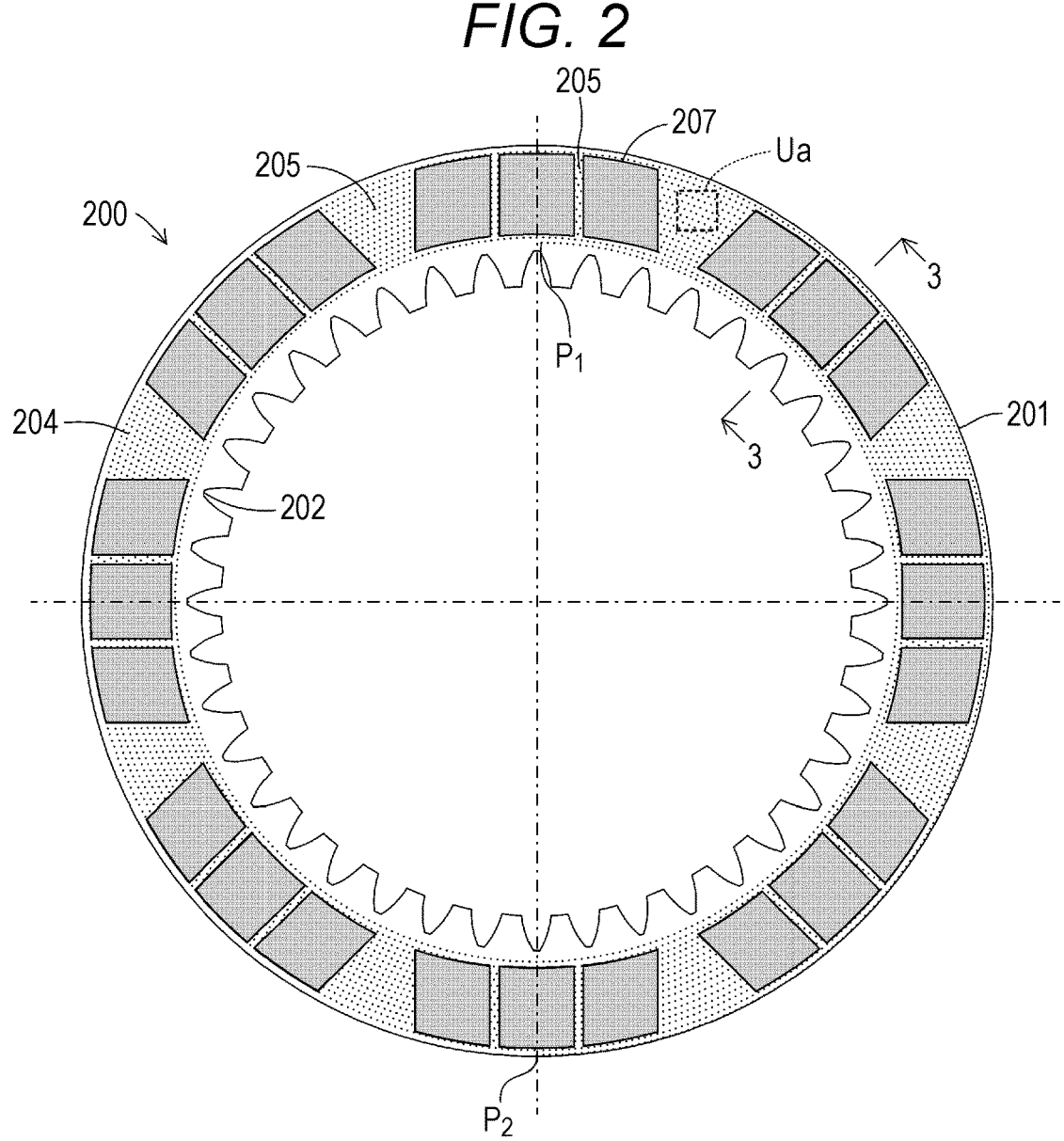
FIG. 2 is a plan view showing the outline of an external configuration of the friction plate according to the present invention, the friction plate being assembled into the multiplate clutch device shown in FIG. 1.
Figure 3:
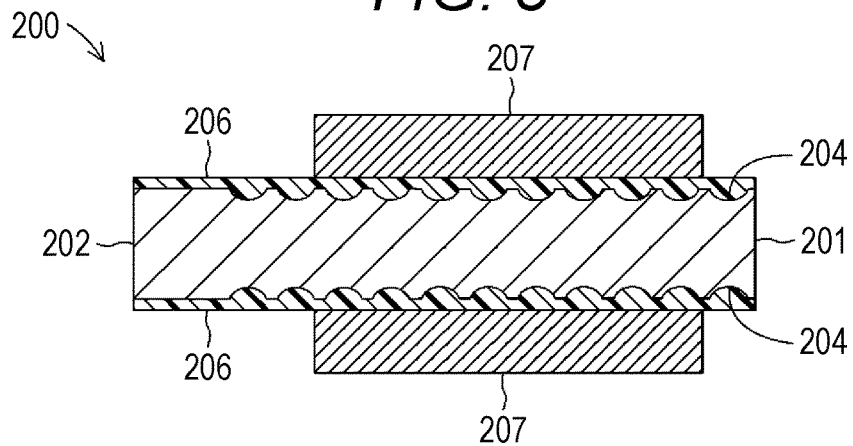
FIG. 3 is a partially-enlarged side view of the friction plate schematically showing the sectional shape of the friction plate along a 3-3 line shown in FIG. 2.

Hereinafter, one embodiment of a joint component, a multiplate clutch device including the joint component, and a friction plate manufacturing method according to the present invention will be described with reference to the drawings. FIG. 1 is a sectional view showing the outline of an entire configuration of a multiplate clutch device 100 including friction plates 200 as joint components according to the present invention. Moreover, FIG. 2 is a plan view showing the outline of an external configuration of the friction plate 200 included in the multiplate clutch device 100 shown in FIG. 1. Further, FIG. 3 is a partially-enlarged side view schematically showing a sectional view of the friction plate 200 along a 3-3 line shown in FIG. 2. Note that each figure as a reference in the present specification is schematically shown for the sake of easy understanding of the present invention and, e.g., some components are exaggeratingly shown. For this reason, the dimensions, ratios, etc. of the components may vary. The multiplate clutch device 100 is a mechanical device for transmitting drive force of an engine (not shown) as a motor in a two-wheeled vehicle (a motorcycle) to a wheel (not shown) as a drive target or blocking such force transmission. The multiplate clutch device 100 is arranged between the engine and a transmission (not shown).

(Configuration of Multiplate Clutch Device 100)

The multiplate clutch device 100 includes a housing 101 made of aluminum alloy. The housing 101 is a member formed in a bottomed cylindrical shape and forming part of a housing of the multiplate clutch device 100. An input gear 102 is, with a rivet 102b, fixed to the left side surface of the housing 101 as viewed in the figure through a torque damper 102a. The input gear 102 is rotatably driven with the input gear 102 engaging with a not-shown drive gear which is rotatably driven by drive of the engine. On an inner peripheral surface of the housing 101, multiple (eight in the present embodiment) clutch plates 103 are held by spline fitting so as to displace along an axial direction of the housing 101 and rotate integrally with the housing 101.

The clutch plate 103 is an annular flat plate-shaped component to be pressed against the later-described friction plate 200. The clutch plate 103 is formed in such a manner that a thin plate member made of a steel plate cold commercial (SPCC) material is punched into an annular shape. Not-shown oil grooves having depths of several μm to several tens of μm for holding later-described lubricant oil are formed at both side surfaces (front and back surfaces) of each clutch plate 103. Moreover, for the purpose of improving abrasion resistance, surface hardening treatment is performed for both side surfaces (the front and back surfaces) of each clutch plate 103 formed with the oil grooves. Note that such surface hardening treatment does not directly relate to the present invention, and for this reason, description thereof will be omitted.

In the housing 101, a friction plate holder 104 formed in a substantially cylindrical shape is arranged concentrically with the housing 101. Many spline grooves are formed along an axial direction of the friction plate holder 104 at an inner peripheral surface of the friction plate holder 104. A shaft 105 is spline-fitted in these spline grooves. The shaft 105 is a shaft body formed in a hollow shape. One (the right side as viewed in the figure) end side of the shaft 105 rotatably supports the input gear 102 and the housing 101 through a needle bearing 105a, and supports the spline-fitted friction plate holder 104 in a fixed manner through a nut 105b. That is, the friction plate holder 104 rotates integrally with the shaft 105. On the other hand, the other (the left side as viewed in the figure) end side (not shown) of the shaft 105 is coupled to the not-shown transmission of the two-wheeled vehicle.

A shaft-shaped push rod 106 is arranged to penetrate a hollow portion of the shaft 105 with the push rod 106 protruding from the above-described one (the right side as viewed in the figure) end portion of the shaft 105. Of the push rod 106, a side (the left side as viewed in the figure) opposite to the end portion protruding from the one (the right side as viewed in the figure) end portion of the shaft 105 is coupled to a not-shown clutch operation lever of the two-wheeled vehicle. The push rod 106 slides along an axial direction of the shaft 105 in the hollow portion of the shaft 105 by operation of the clutch operation lever.

On an outer peripheral surface of the friction plate holder 104, the multiple (seven in the present embodiment) friction plates 200 are held by spline fitting so as to displace along the axial direction of the friction plate holder 104 and rotate integrally with the friction plate holder 104 with each clutch plate 103 being sandwiched between adjacent ones of the friction plates 200.

On the other hand, the inside of the friction plate holder 104 is filled with a predetermined amount of lubricant oil (not shown), and three tubular support rods 104a are formed in the friction plate holder 104 (the figure shows only one tubular support rod 104a). The lubricant oil is supplied to among the friction plates 200 and the clutch plates 103, thereby absorbing friction heat generated among the friction plates 200 and the clutch plates 103 and preventing abrasion of friction members 207.

Each of the three tubular support rods 104a is formed so as to protrude outwardly (the right side as viewed in the figure) in the axial direction of the friction plate holder 104. A pressing cover 107 arranged at a position concentric with the friction plate holder 104 is assembled through a bolt 108a, a receiving plate 108b, and a coil spring 108c. The pressing cover 107 is formed in a substantially discoid shape having the substantially same outer diameter as the outer diameter of the friction plate 200. The pressing cover 107 is pressed to a friction plate holder 104 side by the coil spring 108c. At a center portion inside the pressing cover 107, a release bearing 107a is provided at a position facing the right tip end portion of the push rod 106 as viewed in the figure.

(Configuration of Friction Plate 200)

Specifically, as shown in each of FIGS. 2 and 3, the friction plate 200 includes each of oil grooves 205 and the friction members 207 on an annular flat plate-shaped core 201. The core 201 is a member forming a base portion of the friction plate 200. The core 201 is formed in such a manner that a thin plate member made of a steel plate cold commercial (SPCC) material is punched into a substantially annular shape. In this case, an internal gear-shaped spline 202 to be spline-fitted onto the friction plate holder 104 is formed at an inner peripheral portion of the core 201.

At a side surface of the friction plate 200 facing the clutch plate 103, i.e., a circular ring-shaped plate surface of the core 201 facing the clutch plate 103, the friction members 207 are provided along a peripheral direction of the core 201 on a joint surface 203 through fine recessed portions 204 and a cover layer 206.

The joint surface 203 is a portion to which the friction members 207 are joined, and is formed as a flat surface. In the present embodiment, the joint surface 203 is, as indicated by a hatched portion in FIG. 4, formed in a circular ring shape outside the spline 202 in a radial direction at the plate surface of the core 201. In this case, the joint surface 203 is formed with a slightly greater width than the width of the friction member 207 in the radial direction of the core 201. Further, a portion formed with no small piece-shaped friction members 207 among the friction members 207 also forms the joint surface 203. That is, the joint surface 203 is formed with a slightly greater width than the width of the friction member 207 in the radial direction of the core 201 in a circular ring shape continuously extending along the peripheral direction of the core 201.

The joint surface 203 is formed at each surface of the core 201, and is formed as a flat surface with a flatness of equal to or less than 0.15 mm. The flatness described herein is the degree of distortion of a planar shape from a geometrically-accurate flat surface, and is represented by a clearance between two parallel imaginary planes when the clearance between these two imaginary planes is minimum in a case where a surface as a measurement target is sandwiched between the two imaginary planes. The flatness can be measured by, e.g., a dial gauge, an optical flat (a plane gauge), or a measuring instrument using laser light.

Note that the joint surface 203 may be formed with the same width as the width of the friction member 207 in the radial direction of the core 201, needless to say. Alternatively, the joint surface 203 may be formed only by a portion of the plate surface of the core 201 to which the friction members 207 are joined, i.e., a portion to which the friction members 207 are actually joined other than a portion formed with no small piece-shaped friction members 207 among the friction members 207. In the present embodiment, the core 201 is formed with such flat surfaces that the flatness of the entirety of each surface including the joint surface 203 is equal to or less than 0.15 mm. Since the joint surface 203 is not clearly visible, the joint surface 203 is purposely hatched in FIG. 4, but is not shown in FIGS. 2, 3, and 7.

The fine recessed portion 204 is a portion for improving joint force of the friction member 207 joined onto the joint surface 203. The fine recessed portion 204 is formed in a shape recessed from the joint surface 203. In this case, the fine recessed portion 204 opens with an extremely-small size at the joint surface 203. Specifically, the fine recessed portion 204 opens with such a size that the fine recessed portion 204 is within a circle with a diameter of 40 µm to 120 µm. In the present embodiment, the fine recessed portion 204 opens in the shape of a circle with a diameter of 80 µm as viewed in plane.

The fine recessed portion 204 includes a bottomed hole. In the present embodiment, the fine recessed portion 204 is formed in such a spherical shape that a deepest portion of a bottom portion has a depth of 10 µm. Note that the fine recessed portion 204 may be formed so as to penetrate the core 201.

The fine recessed portions 204 are formed such that adjacent ones of the fine recessed portions 204 at the joint surface 203 do not overlap with each other and a formation density per unit area Ua at the joint surface 203 is uniform. In this case, the "uniform formation density" does not mean that a certain number of fine recessed portions 204 is precisely formed at any position at the joint surface 203, but means that the number of fine recessed portions 204 is substantially uniform across the joint surface 203, needless to say. Specifically, the uniform formation density means a density within a range of ±10%. In the present embodiment, about 100 fine recessed portions 204 are formed within a square region of 1 mm² as viewed in plane. Thus, the percentage of the total area of the fine recessed portions 204 in the unit area Ua as viewed in plane is about 50%. Note that the unit area Ua is a virtual region set for the joint surface 203.

The fine recessed portions 204 are arrayed in a spiral shape along the peripheral direction of the core 201. In this case, the fine recessed portions 204 are formed at equal intervals along a spiral direction. The fine recessed portions 204 are formed as laser processing marks remaining after part of the surface of the core 201 has been removed in a recessed shape by laser light irradiation. Note that FIG. 2 and FIGS. 3 and 7 described later exaggeratingly show the fine recessed portions 204.

The oil groove 205 is not only a flow path for guiding the lubricant oil between an inner peripheral edge and an outer peripheral edge of the core 201 of the friction plate 200, but also an oil holding portion for holding the lubricant oil between the friction plate 200 and the clutch plate 103. The oil groove 205 is formed as a clearance between adjacent ones of the friction members 207. In the present embodiment, the oil grooves 205 include a fan-shaped portion between adjacent groups of three small piece-shaped friction members 207 and a linear portion between adjacent ones of three friction members 207 arranged between adjacent two of the fan-shaped oil grooves 205.

The cover layer 206 is a portion covering the fine recessed portions 204 formed at a portion of the core 201 provided with no friction members 207. Specifically, the cover layer 206 is made of a thermosetting resin adhesive, and is formed with a substantially uniform thickness across the entirety of each surface of the core 201. In the present embodiment, the cover layer 206 is also formed on each side surface of the spline 202.

The cover layer 206 is formed with such a thickness that at least the depth of the fine recessed portion 204 is decreased by application of the cover layer 206. Specifically, the cover layer 206 preferably has a thickness of equal to or greater than 1 µm and equal to or less than 30 µm and more preferably equal to or greater than 5 µm and equal to or less than 20 µm. In the present embodiment, the cover layer 206 is formed with a thickness of 6 µm from the surface of the core 201. In this case, the cover layer 206 is formed transparent or translucent to such an extent that a person can visually recognize the surface of the core 201.

As the thermosetting resin forming the cover layer 206, phenol resin, modified phenol resin, epoxy resin, urea resin, unsaturated polyester resin, polyurethane resin, or polyimide resin may be used. In the present embodiment, the cover layer 206 is made of phenol resin. Alternatively, as the resin forming the cover layer 206, various elastomers (e.g., nitrile rubber-based elastomer or chloroprene rubber-based elastomer) may be used other than the thermosetting resin. In this case, the resin forming the cover layer 206 does not necessarily have adhesion properties. That is, it may only be required that the cover layer 206 is made of such resin that at least the depth of the fine recessed portion 204 can be decreased by application of the resin. As a material for fixing the friction member 207 onto the core 201, an adhesive made of a substance different from the resin forming the cover layer 206 may be used.

The friction member 207 improves friction force against the clutch plate 103. The friction member 207 is made of a small piece-shaped paper material bonded along the peripheral direction of the core 201. In the present embodiment, the friction members 207 are formed such that eight small piece groups are arranged in the peripheral direction of the core 201 through eight fan-shaped oil grooves 205. In each small piece group, three rectangular small pieces extending in the peripheral direction of the core 201 are arranged in the peripheral direction of the core 201 through two linear oil grooves 205. Note that it may only be required that the friction member 207 is made of a material capable of improving the friction force between the friction plate 200 and the clutch plate 103. The friction member 207 may be made of a material other than the paper material, such as a cork material, a rubber material, or a glass material. Note that in FIG. 2, the friction members 207 are illustrated as darker-shaded areas.

(Manufacturing of Friction Plate 200)

Figure 4:
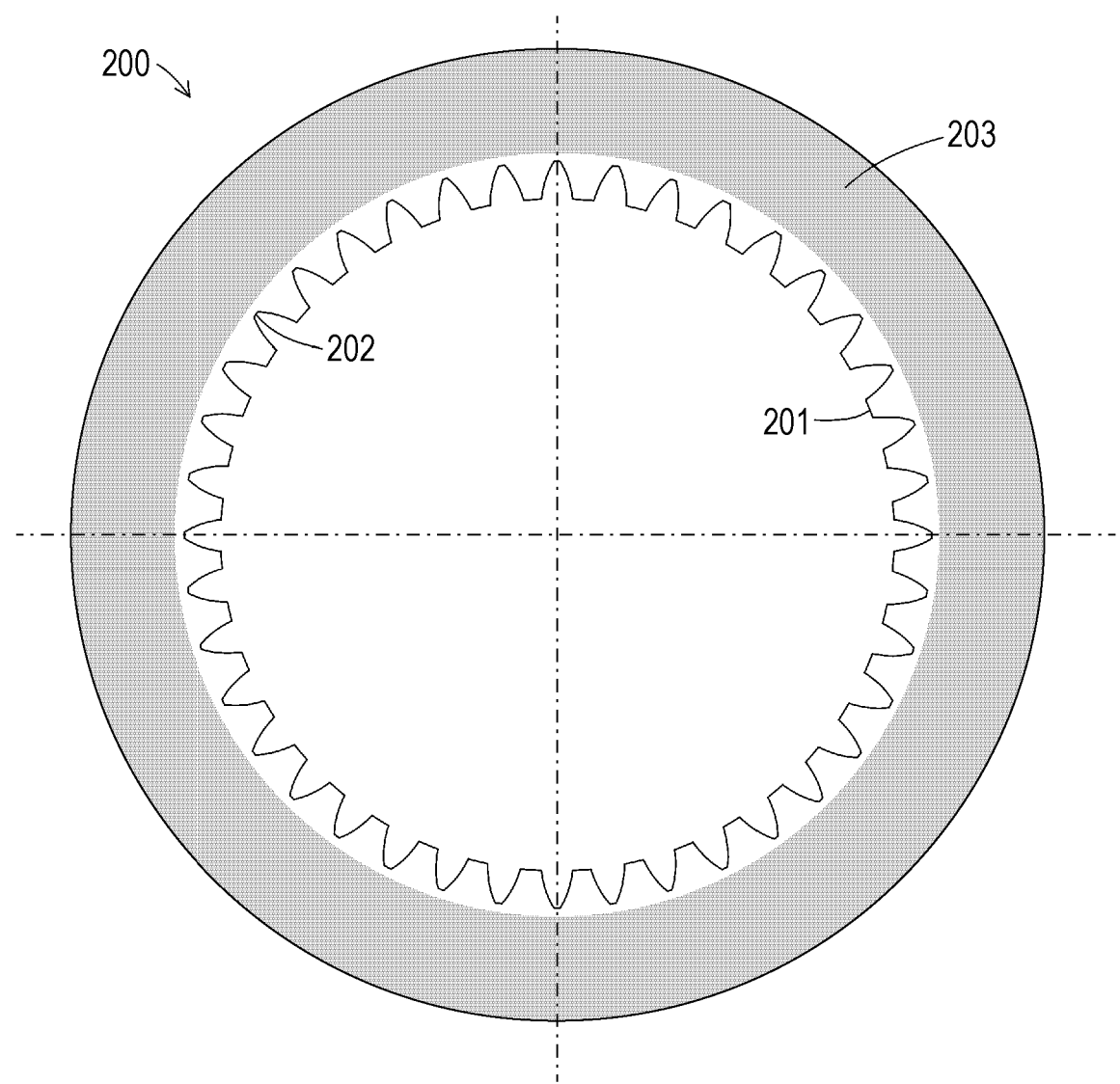
FIG. 4 is a plan view showing the outline of an external configuration of a core forming the friction plate shown in FIG. 2.
Figure 5:
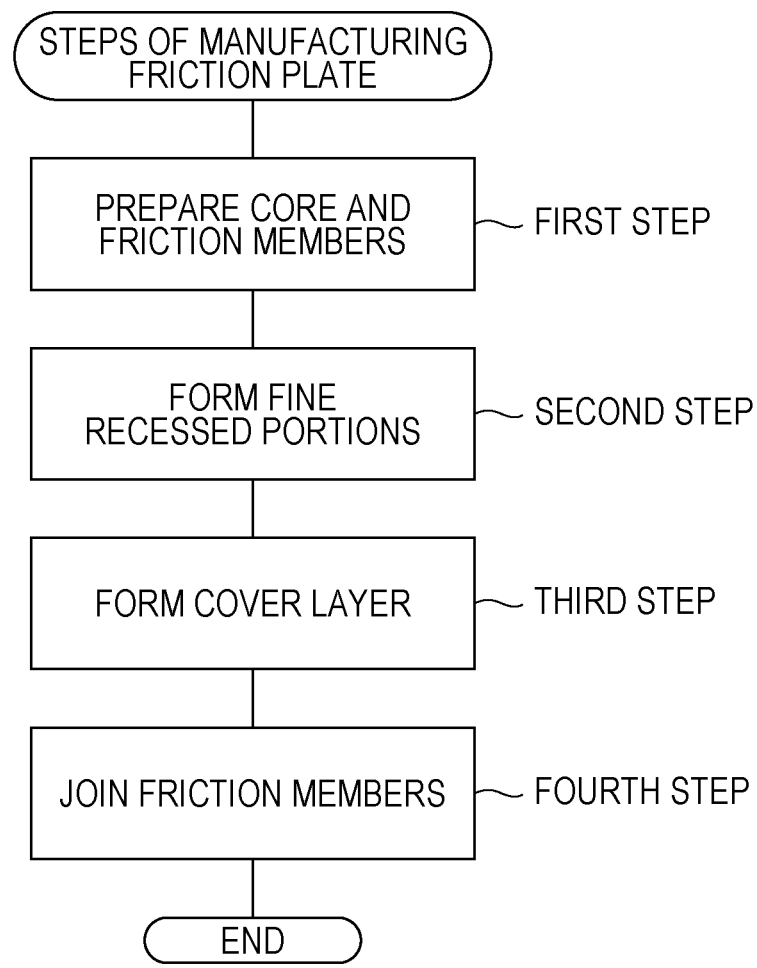
FIG. 5 is a flowchart showing the steps of manufacturing the friction plate according to the present invention.

Next, the method for manufacturing the friction plate 200 configured as described above will be briefly described with reference to FIG. 5. First, a worker prepares, as a first step, each of the core 201 and the friction members 207. Specifically, as shown in FIG. 4, the worker forms, by pressing performed separately, the core 201 into a circular ring shape having the spline 202.

Such pressing is the well-known processing technique of punching a metal (e.g., a SPCC material) thin plate member as the material of the core 201 into a circular ring shape by means of a die. In this case, the worker uses a plate member with a flatness of equal to or less than 0.15 mm as the metal thin plate member which is the material of the core 201. In this manner, the worker can obtain the flat plate-shaped core 201 having the flat joint surfaces 203 with a flatness of equal to or less than 0.15 mm. That is, the step of preparing the core 201 at the first step is equivalent to a base body preparation step according to the present invention. The friction members 207 are formed in a band shape by papermaking performed separately. Papermaking for the friction members 207 is a typical well-known technique, and therefore, description thereof will be omitted.

Figure 6:
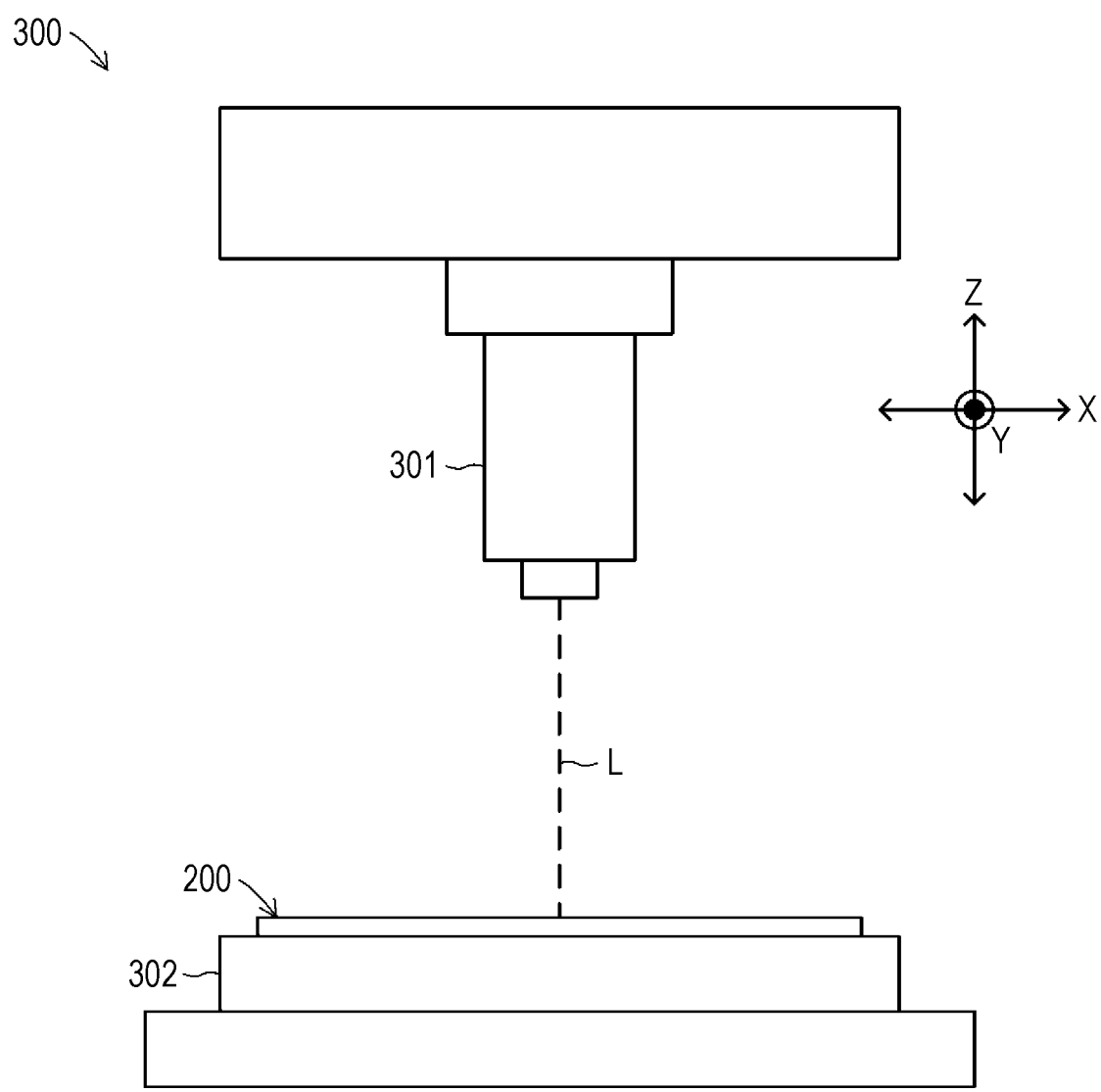
FIG. 6 is a side view schematically showing the outline of the configuration of a laser processing device used at a fine recessed portion formation step at the steps of manufacturing the friction plate as shown in FIG. 5.

Next, the worker forms, as a second step, the fine recessed portions 204 at each surface of the core 201. In this case, the worker forms, as shown in FIG. 6, the fine recessed portions 204 by means of a laser processing device 300. The laser processing device 300 described herein is a mechanical device for forming the fine recessed portions 204 by irradiation of the core 201 with laser light L. The laser processing device 300 is a well-known mechanical device, and detailed description thereof will be omitted. Note that the configuration thereof will be briefly described.

The laser processing device 300 mainly includes each of a laser oscillator (not shown), a laser adjustment optical system (not shown), a laser head 301, a work table 302, and a control device (not shown). The laser oscillator is a mechanical device for emitting the laser light L for removing the surface of the core 201 in a recessed shape and forming the fine recessed portions 204 accordingly. In the present embodiment, the laser oscillator is an oscillator having a frequency of 300 kHz and an output power of 60 W and configured to oscillate pulse laser light with a short pulse width such as a pulse width of nanoseconds, picoseconds, or femtoseconds. The laser adjustment optical system includes an optical component including various optical elements such as a lens and a mirror, an optical fiber, and the like, and the optical component guides the laser light L, emitted from the laser oscillator, to the laser head 301 while performing various types of adjustment such as correction of a beam diameter, a beam shape, and an aberration.

The laser head 301 is an optical device configured to emit the laser light L, which has been guided from the laser adjustment optical system, toward the work table 302 to collect the laser light L onto the core 201. The laser head 301 is configured displaceable in three axial directions of an X-axis direction, a Y-axis direction, and a Z-axis direction perpendicular to each other relative to the work table 302. The work table 302 is a device detachably holding the core 201, to which the friction members 207 are bonded, at a position facing the laser head 301. Note that the laser head 301 and the work table 302 are in a relative positional relationship. Thus, a configuration in which the work table 302 is displaceable instead of the laser head 301 may be employed, needless to say.

The control device includes a microcomputer having a CPU, a ROM, a RAM, and the like, and controls actuation of the entirety of the laser processing device 300 in an integrated manner. Specifically, the control device controls, according to a worker's instruction, actuation of each of the laser oscillator, the laser adjustment optical system, and the laser head 301 to displace the laser light L onto the core 201 during irradiation, thereby forming the fine recessed portions 204.

At this second step, the worker holds the core 201 on the work table 302. Thereafter, the worker instructs the control device of the laser processing device 300 to process the fine recessed portions 204. In response to such an instruction, the control device displaces the laser head 301 in the X-axis direction and the Y-axis direction while the laser light L is being emitted from the laser head 301, thereby displacing the laser light L on the core 201 to form the fine recessed portions 204.

Figure 7:
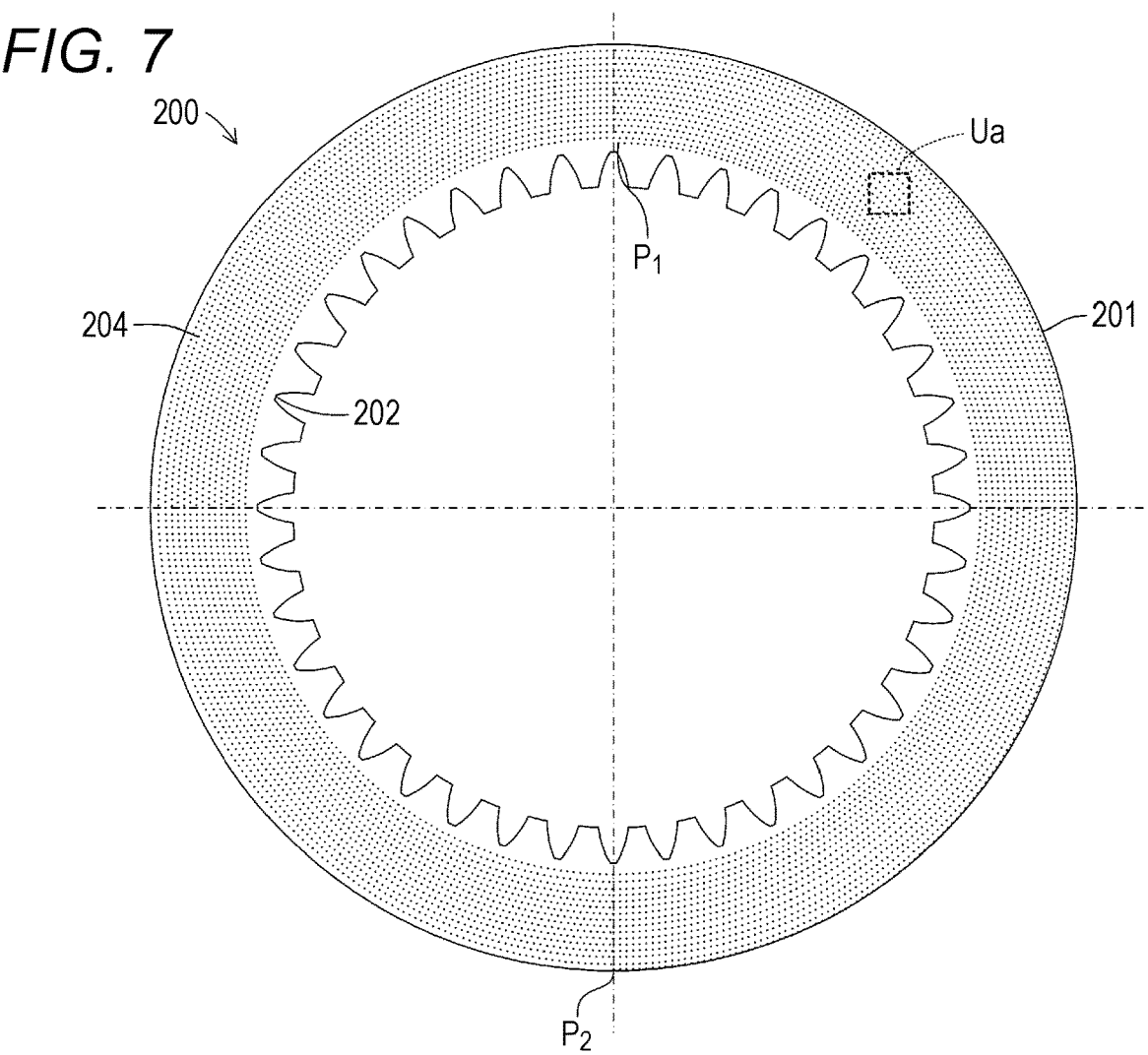
FIG. 7 is a plan view schematically showing a state in which fine recessed portions are formed at the core shown in FIG. 4.
Figure 8:
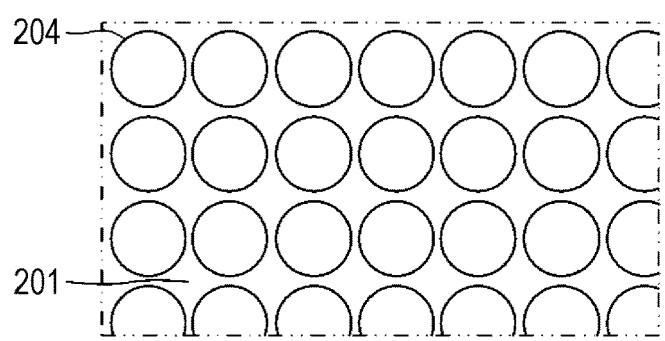
FIG. 8 is a partial view for describing one variation of a fine recessed portion formation pattern according to a modification of the present invention.
Figure 9:
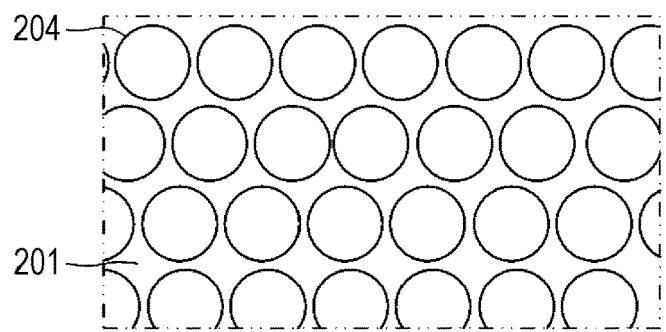
FIG. 9 is a partial view for describing one variation of the fine recessed portion formation pattern according to another modification of the present invention.
Figure 10:
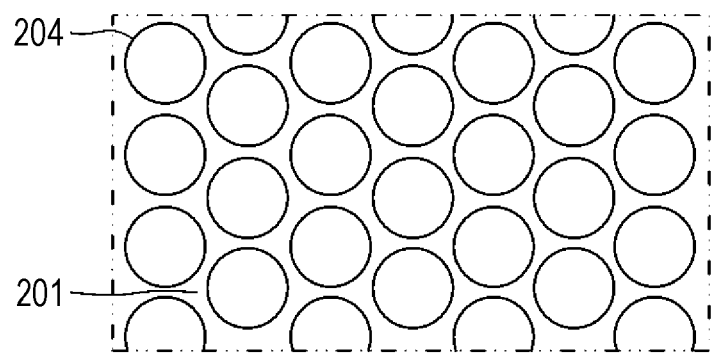
FIG. 10 is a partial view for describing one variation of the fine recessed portion formation pattern according to another modification of the present invention.
Figure 11:
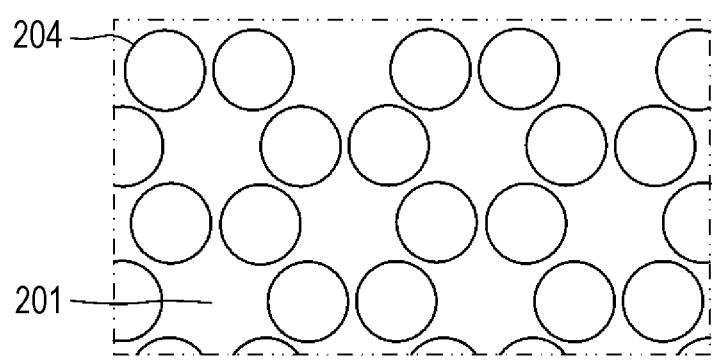
FIG. 11 is a partial view for describing one variation of the fine recessed portion formation pattern according to another modification of the present invention.

Specifically, the control device starts, as shown in FIG. 7, irradiating an innermost peripheral portion of the joint surface 203 of the core 201 with the laser light L. Starting from a position $P_1$, the control device displaces the laser head 301 in a spiral pattern extending gradually outwardly in the radial direction, and when the laser head 301 reaches a position $P_2$ of an outermost peripheral portion of the joint surface 203, stops emission of the laser light L. In this manner, many fine recessed portions 204 are formed in the spiral shape along the peripheral direction at the joint surface 203 of the core 201.

In this case, at the joint surface 203 of the core 201, the fine recessed portions 204 are formed such that adjacent ones of the fine recessed portions 204 do not overlap with each other and the formation density per unit area Ua is uniform. Thus, the flatness (equal to or less than 0.15 mm) of the entirety of the side surface including the joint surface 203 can be maintained. Note that in the present embodiment, each fine recessed portion 204 is formed by one processing mark formed by a single pulse of laser light L emitted from the laser head 301. One fine recessed portion 204 may be formed by multiple processing marks (i.e., two or more pulses of laser light L). Note that in FIG. 7, the circular path of displacement of the laser light L is indicated by a dashed line.

Subsequently, the worker takes the core 201 from the work table 302. Accordingly, the process of forming the fine recessed portions 204 on one side of the core 201 ends. Thus, the worker turns over the core 201 formed with the fine recessed portions 204, and performs a similar process for another surface to form the fine recessed portions 204. In this manner, the worker can form the fine recessed portions 204 at each joint surface 203 of the core 201. That is, the second step is equivalent to a fine recessed portion formation step according to the present invention.

Next, the worker forms, as a third step, the cover layer 206 on each of the two plate surfaces of the core 201. Specifically, the worker heats and dries, as shown in FIG. 3, a resin layer raw material containing liquid thermosetting resin as the raw material of the cover layer 206 after the resin layer raw material has been applied to the entirety of each of the two plate surfaces of the core 201 by means of a tool such as a brush or a roller. In this manner, the cover layer 206 made of the hardened resin layer raw material can be formed. In this case, the worker coats the surface of the core 201 once or overcoats the surface of the core 201 multiple times, thereby forming the cover layer 206. The third step is equivalent to a cover layer formation step according to the present invention.

Next, the worker bonds, as a fourth step, the friction members 207 to each of the two plate surfaces of the core 201. Specifically, the worker applies a liquid adhesive (not shown) to the entirety of each of the two cover layers 206 on the core 201 by means of a tool such as a brush or a roller. Thereafter, the worker places the friction members 207 before the adhesive is dried, and then, dries the adhesive. In the present embodiment, a resin layer raw material containing the same liquid thermosetting resin as the raw material of the cover layer 206 is used as the adhesive. That is, the resin raw material forming the cover layer 206 is made of the adhesive.

In this case, the worker may cut, after the friction members 207 have been placed on the core 201, the band-shaped friction members 207 placed on the core 201, thereby forming the friction members 207 into the small piece shape. Alternatively, the worker may place the friction members 207, which are formed in the small piece shape in advance, on the core 201. In this manner, the friction members 207 are fixed onto the cover layers 206 on the core 201. The fourth step is equivalent to a joint object joining step according to the present invention.

Note that at the fourth step, the worker may apply the adhesive only to positions at which the friction members 207 are to be arranged or only onto the circular ring-shaped joint surface 203. Alternatively, the worker may apply the adhesive to a friction member 207 side instead of or in addition to application of the adhesive to the core 201. Thereafter, the worker performs a friction property adjustment step and an inspection step, thereby completing the friction plate 200. These steps do not directly relate to the present invention, and therefore, description thereof will be omitted.

(Actuation of Multiplate Clutch Device 100 and Friction Plate 200)

Next, actuation of the multiplate clutch device 100 and the friction plate 200 configured as described above will be described. As described above, the friction plates 200 are used with the friction plates 200 being assembled into the multiplate clutch device 100. The multiplate clutch device 100 is, as described above, arranged between the engine and the transmission in the vehicle, thereby transmitting the drive force of the engine to the transmission or block such force transmission according to operation of the clutch operation lever by a driver of the vehicle.

That is, in a case where the driver (not shown) of the vehicle operates the clutch operation lever (not shown) to retract (displace to the left side as viewed in the figure) the push rod 106, the push rod 106 is brought into a state in which the tip end portion thereof does not press the release bearing 107a, and the pressing cover 107 presses the clutch plates 103 by elastic force of the coil spring 108c. Accordingly, the clutch plates 103 and the friction plates 200 are pressed against each other while displacing to a receiving portion 104b side, a receiving portion 104b being formed in a flange shape at the outer peripheral surface of the friction plate holder 104. Accordingly, the clutch plates 103 and the friction plates 200 are brought into a friction-coupled state. As a result, the drive force of the engine transmitted to the input gear 102 is transmitted to the transmission through the clutch plates 103, the friction plates 200, the friction plate holder 104, and the shaft 105.

Since the friction members 207 are firmly joined to the core 201 through the fine recessed portions 204, the friction plates 200 can transmit the rotary drive force to the clutch plates 103 with a favorable accuracy in a state in which the clutch plates 103 and the friction plates 200 friction-contact each other.

On the other hand, in a case where the driver of the vehicle operates the clutch operation lever (not shown) to advance (displace to the right side as viewed in the figure) the push rod 106, the push rod 106 is brought into a state in which the tip end portion thereof presses the release bearing 107a, and the pressing cover 107 displaces to the right side as viewed in the figure against the elastic force of the coil spring 108c to separate from and the clutch plates 103. Accordingly, the clutch plates 103 and the friction plates 200 displace to a pressing cover 107 side, and a state in which these plates are pressed against and coupled to each other is cancelled. Thus, the clutch plates 103 and the friction plates 200 are separated from each other. As a result, the drive force is no longer transmitted from the clutch plates 103 to the friction plates 200, and transmission of the drive force, which has been transmitted to the input gear 102, of the engine to the transmission is blocked.

In a state in which the clutch plates 103 and the friction plates 200 are separated from each other, the friction members 207 are also firmly joined to the core 201 through the fine recessed portions 204 at the friction plates 200. Thus, neither detachment of the friction member 207 from the core 201 nor partial twisting or floating of the friction member 207 is caused. At the friction plate 200, the fine recessed portions 204 formed at a portion of the joint surface 203 of the core 201 provided with no friction members 207, such as the oil groove 205, are covered with the adhesive for the friction member 207. Thus, degradation of the flowability of the lubricant oil can be prevented.

As can be understood from description of actuation above, according to the above-described embodiment, in the multiplate clutch device 100 including the friction plates 200 as the joint components, many fine recessed portions 204 formed at the joint surfaces 203 of the metal core 201 as a target to which the friction members 207 as joint objects are joined are formed not to overlap with each other and to have the uniform formation density per unit area Ua. With this configuration, the flatness of the joint surface 203 can be equal to or less than 0.15 mm.

Further, implementation of the present invention is not limited to the above-described embodiment, and various changes can be made without departing from the object of the present invention.

For example, in the above-described embodiment, the fine recessed portion 204 is formed so as to open in the shape of the circle with a diameter of 80 μm as viewed in plane. However, it may only be required that the fine recessed portion 204 is formed so as to open with such a size that the fine recessed portion 204 is within the circle with a diameter of 40 μm to 120 μm. Thus, the fine recessed portion 204 may be formed in a shape other than the circular or oval shape, such as a quadrangular or triangular shape.

In the above-described embodiment, the fine recessed portion 204 is formed in such a spherical shape that the deepest portion of the bottom portion has a depth of 10 μm. However, the fine recessed portion 204 may be formed such that the depth from the joint surface 203 to the bottom portion may be less than 10 μm or equal to or greater than 10 μm. Alternatively, in the fine recessed portion 204, the bottom portion may be formed in a shape other than the spherical shape, such as a quadrangular or pyramid shape. Note that in a case where the fine recessed portions 204 are formed at the core 201, the depth of the fine recessed portion 204 is preferably equal to or greater than 5 μm and equal to or less than 20 μm and more preferably equal to or less than 10 μm.

In the above-described embodiment, the fine recessed portions 204 are formed such that the total opening area as viewed in plane is 50% with respect to the unit area Ua. However, it may only be required that the fine recessed portions 204 are formed such that at least the formation density per unit area Ua is uniform at any position in a region formed with the fine recessed portions 204. Thus, the fine recessed portions 204 may be formed such that the total opening area as viewed in plane is less than 50% or exceeds 50% with respect to the unit area Ua. In this case, the fine recessed portions 204 are preferably formed such that the total opening area as viewed in plane is equal to or greater than 40% and equal to or less than 80% with respect to the unit area Ua. Moreover, it may only be required that the fine recessed portions 204 are formed such that adjacent ones of the fine recessed portions 204 do not overlap with each other, i.e., are separated from each other. Note that the fine recessed portions 204 may be formed such that adjacent ones of the fine recessed portions 204 contact each other.

In the above-described embodiment, the fine recessed portions 204 are formed so as to be arrayed in the spiral shape along the peripheral direction of the core 201. However, it may only be required that the fine recessed portions 204 are formed such that adjacent ones of the fine recessed portions 204 do not overlap with each other and the formation density per unit area Ua smaller than the area of the joint surface is uniform. Thus, as shown in, e.g., FIG. 8, the fine recessed portions 204 may be formed so as to be arranged linearly along each of two directions (the right-left and upper-lower directions as viewed in the figure) perpendicular to each other at the center of the core 201. Alternatively, as shown in, e.g., FIG. 9, the fine recessed portions 204 may be formed such that a certain line of the fine recessed portions 204 arranged linearly in the right-left direction as viewed in the figure is arranged so as to be shifted from an adjacent line of the fine recessed portions 204 in an arrangement direction. Alternatively, as shown in, e.g., FIG. 10, the fine recessed portions 204 may be formed such that a distance between adjacent ones of the fine recessed portions 204 is uniform. Alternatively, as shown in, e.g., FIG. 11, the fine recessed portions 204 may be formed such that adjacent ones of the fine recessed portions 204 are arranged in an annular shape. As an alternative other than those described above, the fine recessed portions 204 may be formed so as to be arranged in a radial or circular ring shape. Note that FIGS. 8 to 11 show only some of many fine recessed portions 204 formed at the joint surface 203.

In the above-described embodiment, the fine recessed portions 204 are processed using the pulse laser light L. However, the fine recessed portions 204 may be formed using a processing method other than laser processing. For example, the fine recessed portions 204 may be also formed by discharging. Thus, the fine recessed portions 204 may be processing marks other than the processing marks formed by the laser light.

In the above-described embodiment, the joint surface 203 of the core 201 is formed such that the flatness thereof is equal to or less than 0.15 mm. However, it may only be required that the joint surface 203 is formed such that the flatness thereof is equal to or less than at least 0.2 mm. Thus, the joint surface 203 may be formed such that the flatness thereof is equal to or greater than 0.15 mm and equal to or less than 0.2 mm or the flatness thereof is less than 0.15 mm. Alternatively, the joint surface 203 may be formed only on one side of the core 201. That is, the fine recessed portions 204 may be formed only on one side of the core 201.

In the above-described embodiment, the cover layer 206 is formed across the entirety of each surface of the core 201. However, it may only be required that the cover layer 206 is formed at least on the fine recessed portions 204 on which no friction members 207 are arranged. In this case, the fine recessed portions 204 may be filled with the cover layer 206, and the cover layer 206 may be formed in a layer shape on the surface of the core 201. Alternatively, part or the entirety of the fine recessed portions 204 may be filled with the cover layer 206, and the cover layer 206 is not necessarily formed on the surface of the core 201.

In the above-described embodiment, the friction plate 200 is formed such that the fine recessed portions 204 are covered with the cover layers 206. However, the friction plate 200 may be formed without the cover layers 206. That is, the cover layer formation step may be omitted from the steps of manufacturing the friction plate. The cover layer 206 is made of the resin material having the adhesion properties for the friction member 207. However, the cover layer 206 does not necessarily have the adhesion properties, and may be made of a resin material having no adhesion properties for the friction member 207. Alternatively, the cover layer 206 may be formed opaque.

In the above-described embodiment, the friction members 207 are provided in such a manner that the multiple small pieces are discontinuously arranged along the peripheral direction of the core 201 through the clearances forming the oil grooves 205. However, the friction members 207 are provided as necessary according to the specifications of the multiplate clutch device 100. Thus, the friction member 207 may be formed in a circular ring shape continuously extending in the peripheral direction of the core 201. That is, the friction plate 200 may be formed without the oil grooves 205.

In the above-described embodiment, the friction plates 200 are held by the friction plate holder 104 to be rotatably driven integrally with the shaft 105. That is, the friction plate 200 is applied as an opposing plate, and the opposing plate is arranged facing the clutch plate 103 to be rotatably driven by the rotary drive force of the engine and is rotatably driven integrally with the shaft 105 as an output shaft in the multiplate clutch device 100. However, the friction plate 200 may be also applied to the clutch plate 103 as a drive-side plate to be rotatably driven by the rotary drive force of the engine.

In the above-described embodiment, the laser processing device 300 is configured to displace the laser head 301 in the three axial directions of the X-axis direction, the Y-axis direction, and the Z-axis direction perpendicular to each other. However, other configurations may be employed as long as the laser processing device 300 is configured so that fine recessed portions 204 can be formed at the friction members 207 on the core 201. Thus, the laser processing device 300 may include, for example, a galvanoscanner or a polygon mirror in the laser head 301 to scan the laser light in each of the X-axis direction and the Y-axis direction instead of or in addition to displacement of the laser head 301 and/or the work table 302. Alternatively, the laser processing device 300 may be configured such that the core 201 to which the friction members 207 are bonded is held on the work table 302 configured movable or fixed and the core 201 is rotatably driven on the work table 302 or is scanned in each of the X-axis direction and the Y-axis direction.

In the above-described embodiment, the friction plate 200 is applied to the wet multiplate clutch device 100 to be rotatably driven in the lubricant oil. However, the friction plate 200 may be also applied to a dry multiplate clutch device 100 using no lubricant oil. Alternatively, the friction plate 200 may be also applied as a friction plate used for a clutch device (not shown) provided in a torque converter configured to amplify drive force from an engine to an output shaft side to transmit such force. Alternatively, the friction plate 200 may be also applied to a friction plate used for a brake device (not shown) configured to put a brake on rotary motion by a motor.

In the above-described embodiment, the example where the joint component according to the present invention is applied as the friction plate 200 has been described. That is, the core 201 in the above-described embodiment is equivalent to a base body according to the present invention, and the friction member 207 in the above-described embodiment is equivalent to the joint object according to the present invention. However, the present invention can be broadly applied to a joint component configured such that a joint object is joined to a planar joint surface formed at a metal base body.

In this case, a metal material forming the base body includes non-ferrous metal such as an aluminum material, a steel material such as stainless steel, and various alloy materials. The joint object may be made of a metal material or a material other than the metal material, such as rubber, elastomer, resin, or ceramic. The joint component includes, for example, a water pump, a cylinder head, an oil pan, and an exterior component of an electronic equipment.

LIST OF REFERENCE SIGNS

Ua Unit Area for Defining Formation Density of Fine Recessed Portions Formed at Joint Surface
L Laser Light
$P_1$ Start Position of Irradiation with Laser Light L on Core 201
$P_2$ Stop Position of Irradiation with Laser Light L outside Core 201
100 Multiplate Clutch Device
101 Housing
102 Input Gear
102a Torque Damper
102b Rivet
103 Clutch Plate
104 Friction Plate Holder
104a Tubular Support Rod
104b Receiving Portion
105 Shaft
105a Needle Bearing
105b Nut
106 Push Rod
107 Pressing Cover
107a Release Bearing
108a Bolt
108b Receiving Plate
108c Coil Spring
200 Friction Plate
201 Core
202 Spline
203 Joint Surface
204 Fine Recessed Portion
205 Oil Groove
206 Cover Layer
207 Friction Member
300 Laser Processing Device
301 Laser Head
302 Work Table

The invention claimed is:
1. A joint component comprising:
a metal base body having a joint surface formed as a flat surface; and
a joint object to be joined to the joint surface,
wherein the joint surface is formed in a circular or circular ring shape as viewed in plane, has a flatness of equal to or less than 0.2 mm, and is formed with many fine recessed portions formed in a recessed shape,
the fine recessed portions are formed such that adjacent ones of the fine recessed portions do not overlap with each other and a formation density per unit area smaller than an area of the joint surface is uniform, the fine recessed portions being formed to be arranged in a spiral shape along a peripheral direction of the joint surface from an inner peripheral portion of the joint surface to an outer peripheral portion of the joint surface,
the base body includes a core formed in an annular flat plate shape,
the joint object includes a friction member bonded to the joint surface along the peripheral direction,
the joint component includes friction plates arranged facing each other in a clutch device or a brake device and configured to closely contact or separate from each other to transmit or block rotary drive force between the friction plates,
the fine recessed portions are also formed at a portion of the base body other than a portion to which the joint object is joined, and
the base body includes a cover layer covering the fine recessed portions formed at the portion other than the portion to which the joint object is joined.
2. The joint component according to claim 1, wherein the fine recessed portions are formed such that a total opening area as viewed in plane in the unit area is equal to or greater than 40% and equal to or less than 80% with respect to the unit area.
3. The joint component according to claim 1, wherein the fine recessed portions are processing marks formed by laser light.

4. The joint component according to claim 1, wherein
a depth of each of the fine recessed portions from the joint surface is equal to or less than 10 μm.

5. The joint component according to claim 1, wherein
a plurality of the friction members each having a small piece shape is provided in a circular ring shape through clearances at the core,
the fine recessed portions are formed in portions, where the friction members are arranged, of the core and also in portions, corresponding to the clearances, of the core.

6. A multiplate clutch device for transmitting or blocking rotary drive force between a drive-side plate to be rotatably driven by a motor and a driven-side plate arranged facing the drive-side plate through a clearance in such a manner that the drive-side plate and the driven-side plate closely contact or separate from each other,
at least one of the drive-side plate or the driven-side plate being the joint component according to claim 1.

7. The joint component according to claim 1, wherein
a width of the joint surface is greater than a width of the friction member in a radial direction of the core.

8. A joint component manufacturing method for manufacturing the joint component configured such that a joint object is joined to a joint surface as a flat surface formed at a metal base body, comprising:
the base body preparation step of preparing the base body having the joint surface with a flatness of equal to or less than 0.2 mm, the joint surface being formed in a circular or circular ring shape;
a fine recessed portion formation step of forming many fine recessed portions at least at the joint surface by irradiating the base body with laser light while relatively displacing the laser light;
a cover layer formation step of forming a cover layer covering the fine recessed portions; and
the joint object joining step of joining the joint object to the joint surface,
wherein at the fine recessed portion formation step, the fine recessed portions are formed in such arrangement that adjacent ones of the fine recessed portions do not overlap with each other and a formation density per unit area smaller than an area of the joint surface is uniform, the fine recessed portions being formed to extend in a spiral shape along a peripheral direction of the joint surface from an inner peripheral portion of the joint surface to an outer peripheral portion of the joint surface.

9. The joint component manufacturing method according to claim 8, wherein
at the fine recessed portion formation step, the fine recessed portions are formed by irradiating the laser light at the inner peripheral portion of the joint surface and then displacing the laser light in a spiral pattern extending gradually toward the outer peripheral portion of the joint surface.

10. The joint component manufacturing method according to claim 8, wherein
a width of the joint surface is greater than a width of the joint object in a radial direction of the base body.

* * * * *